Figure 1:
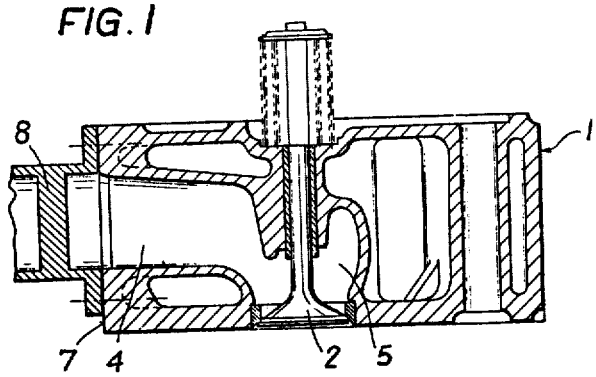

United States Patent [19]
List et al.

[11] 3,874,357
[45] Apr. 1, 1975

[54] METHOD FOR THE IMPROVEMENT OF MIXTURE FORMATION IN THE CYLINDER OF AN INTERNAL COMBUSTION ENGINE AND INTERNAL COMBUSTION ENGINE OPERATED IN ACCORDANCE WITH THIS METHOD

[75] Inventors: Hans List; Erich Schreiber, both of Graz, Austria

[73] Assignee: Hans List, Graz, Austria; by said Erich Schreiber

[22] Filed: Feb. 29, 1972

[21] Appl. No.: 230,228

[30] Foreign Application Priority Data
Jan. 11, 1972  Austria .................................. 213/72

[52] U.S. Cl. ....... 123/191 M, 123/52 M, 123/141 R, 123/188 M, 123/191 R
[51] Int. Cl. ...................... F02b 23/00, F02m 29/00
[58] Field of Search ........ 123/141 R, 188 M, 52 M, 123/52 MB, 52 MF, 191 M

[56] References Cited
UNITED STATES PATENTS

| 1,866,703 | 7/1932 | Gehres .......................... 123/191 M |
| 2,108,740 | 2/1938 | Belford ............................ 123/52 M |
| 2,318,914 | 5/1943 | Anderson et al .............. 123/191 M |
| 2,956,556 | 10/1960 | Weslake ......................... 123/52 MB |
| 3,274,981 | 9/1966 | Peras ............................. 123/191 M |

FOREIGN PATENTS OR APPLICATIONS

| 1,282,159 | 12/1961 | France ............................... 123/141 |
| 1,056,912 | 10/1953 | France .............................. 123/52 M |
| 946,268 | 7/1956 | Germany ........................... 123/52 M |
| 825,837 | 12/1959 | United Kingdom .............. 123/52 M |

*Primary Examiner*—Wendell E. Burns
*Attorney, Agent, or Firm*—Watson, Cole, Grindle and Watson

[57] ABSTRACT

Disclosed is an internal combustion engine, and in particular a diesel engine, wherein the fuel-air mixture provided to the cylinder is improved by splitting the airstream directed to the cylinder into at least two partial streams and thereafter reuniting the partial streams at an angle relative to one another whereby turbulence is provided to provide a more uniform mixture of air and fuel.

2 Claims, 22 Drawing Figures

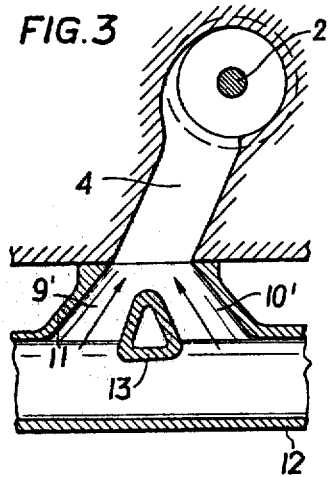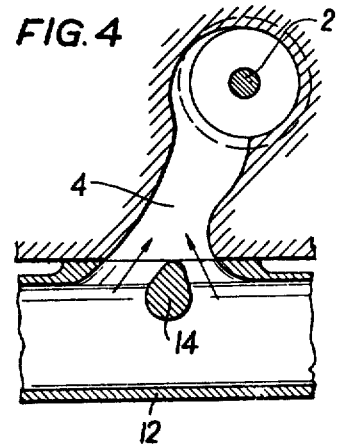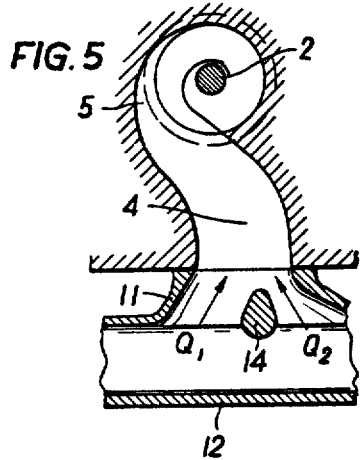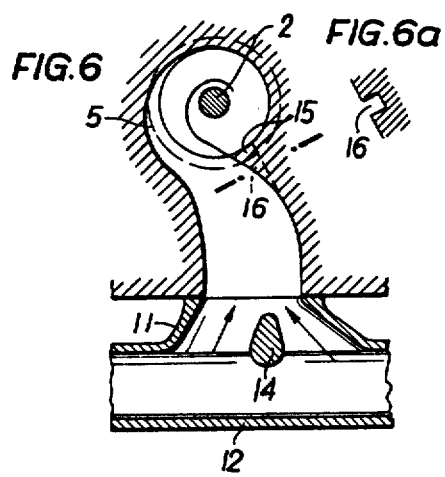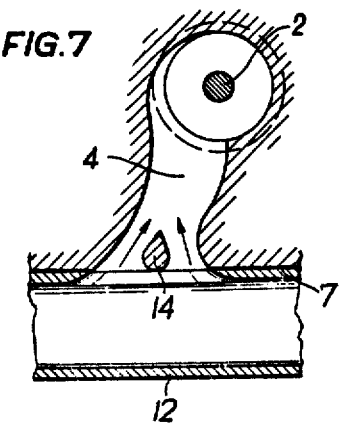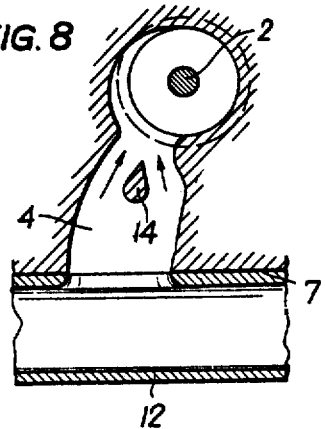

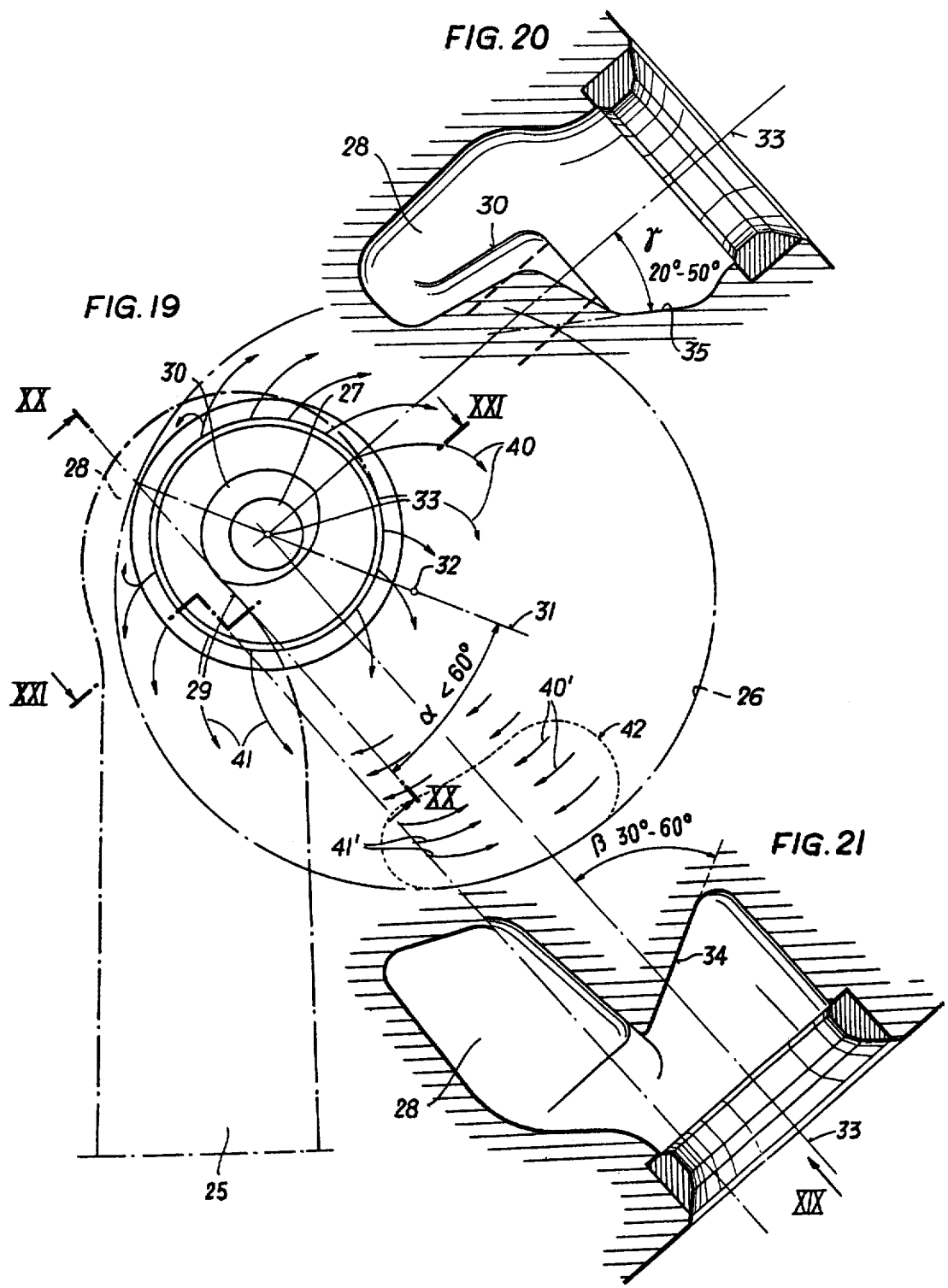

3,874,357

METHOD FOR THE IMPROVEMENT OF MIXTURE FORMATION IN THE CYLINDER OF AN INTERNAL COMBUSTION ENGINE AND INTERNAL COMBUSTION ENGINE OPERATED IN ACCORDANCE WITH THIS METHOD

The present invention relates to a method for the improvement of mixture formation in the cylinder of an internal combustion engine, in particular, of diesel engines with direct fuel-injection and an internal combustion engine operated in accordance with this method.

In order to achieve uniform distribution and an intimate mixture of fuel and air for combustion in engines where the mixture is produced in the cylinder with direct fuel injection, conventional methods provide for the rotation of air entering the cylinder in relation to the cylinder axis as the most efficient process for laterally admitting the air for combustion to the fuel jets arranged in radial constellation. An efficient conventional method for producing this rotation of air inside the cylinder provides for a helical shape of the inlet ports.

Another conventional design achieves the necessary rotation of air in the cylinder by means of inclined ducts directing air for combustion admitted through an intake valve in an essentially tangential direction in relation to the cylinder bore. Likewise, rotation-producing screens for the valves and various insert systems in front of the valve seat have been devised, also for the purpose of improving the rotational flow in the cylinder.

Although there can be no doubt about the effectiveness of conventional methods for the production of air rotation inside the cylinder in view of improving mixture formation, an inevitable drawback of such systems resides in the build-up of areas with substantially diverging degrees of excess air inside the combustion chamber, as a result of which the pattern of combustion becomes irregular, high combustion temperatures prevailing in areas of lesser air surplus. However, high combustion temperatures contribute in an objectionable manner to the formation of large quantities of $NO_x$.

For the conventional design of internal combustion engines with direct fuel injection, high performance and improved efficiency were usually targets of overriding importance which were given priority over such efforts as aimed at reducing the percentage of noxious components, especially of $NO_x$ in the exhaust gas. However, in the wake of present-day tendencies to combat air pollution, the decontamination of exhaust gases rose to ever greater prominence.

It is therefore, the principal object of the present invention to provide a method for the improvement of mixture formation in internal combustion engines chiefly aimed at preventing the production of the highly poisonous $NO_x$ in substantial quantities and capable of being performed in practice by simple means.

According to the invention, a turbulence is produced in at least part of the air current prior to its admission in the cylinder by splitting it into two or more part currents and by making these part currents converge at an angle so as to reunite them into a single stream. Experience has shown that by establishing these peculiar conditions of flow in the inlet portion of an internal combustion engine it is possible to exert a decisive influence on mixture formation in the cylinder. Increased turbulence caused by the impact of clashing part currents is maintained inside the cylinder until such time when the fuel in injected and is responsible for an intense, and above all uniform mixture between air and the injected fuel to a much greater extent than if the mixture were formed without resorting to the production of additional turbulence.

A direction result of improved mixture formation is the relative reduction and isolation of surplus air variations as compared with the average surplus level, so that extremely hot spots in the combustion chamber are avoided to a considerable degree and only minor temperature differences between these areas and the rest of the combustion chamber occur. Consequently, combustion is accompanied by less smoke production and the percentage of $NO_x$ in the combustion gases is substantially reduced.

This mixture of air for combustion and fuel is approximately of the same quality as that obtained in pre-chamber-type engines although the comparatively great loss of energy involved in the provision of pre-chambers is avoided.

Another noteworthy advantage is derived from the fact that a turbulent flow is produced in accordance with the present invention without interfering in any way with such measures as are necessary for the production of air rotation in the cylinder. Therefore, the invention can be applied in actual practice either by itself or in conjunction with conventional methods for producing rotation.

Moreover, improved mixture formation makes it possible for the injection advance angle, that is the angle in crank angle degrees before the upper dead center where fuel injection begins, to be reduced without risking increased soot formation during combustion.

According to a specific embodiment of the present invention, the intake duct is so designed as to cause the formation of essentially two part currents as air is admitted to the cylinder through the valve, each of these two part currents circulating around the cylinder axis in different directions, one of the two part currents being of greater force than the other so as to produce a final rotation in the direction of the stronger current. By the impact of the clash between the stronger with the weaker air current, turbulence in the cylinder is increased without, however, impairing the advantageous rotation of air around the cylinder axis. Experience goes to show that in contrast with conventional methods, mixture formation is improved in quality if only part of the air emerging from the valve and admitted to the cylinder is allowed to rotate in the direction of the duct spiral, whereas the balance is caused to emerge in such a manner that an inverse rotation is imparted it by the cylinder wall so that it will impinge upon the main air current.

According to a further embodiment of the invention, flow losses caused by turbulence are compensated for by supercharging, so as to obtain a delivery rate which is equal to, or even greater than, the normal delivery rate of the engine. The advantage of improved mixture formation is not, however, impaired by these measures.

The invention is further directed to the design and construction of internal combustion engines featuring mixture formation in the cylinder with the application of the method according to the invention. According to a preferred embodiment of the invention, each part current is directed through a separate duct, the various individual ducts converging in front of the intake port. This construction is not only distinguished by the simplicity of its design, but it also makes it possible for existing engines to be readily adapted for use in conformity with the invention. For example, a forked tubulure enclosing the two ducts for the two part air currents converging at an angle is substituted for the conventional suction pipe.

According to another embodiment of the invention as applied to internal combustion engines comprising two or more cylinders connected to a common suction manifold, the individual ducts terminate at the suction manifold in front of the branches of the intake ducts, so that the construction of the intake system inclusive of such devices as serve for the production of turbulent air currents is greatly simplified.

According to yet another embodiment of the invention, the cross-section of the intake duct is subdivided in a manner known per se by means of appropriate inserts extending only over part of the overall length of the intake duct. It is true that in a four-valve internal combustion engine of a known type the two intake valves are connected to a common intake duct subdivided into two sub-ducts by means of an integral hollow casting traversed by one of the cylinder-head fixing bolts. However, this arrangement is not meant to produce a turbulent current but rather serves to split up the air flow among the two intake valves.

According to a further embodiment of the present invention as applied to engines of the type hereabove described, the inserts comprise one or more rods, ribs, or the like extending in transverse relation to the duct axis. In order to achieve the effect required for the performance of the present invention, it is essential for the inserts to be so arranged and shaped as to produce a clash between the part currents passing in between and meeting at a certain angle, thereby producing turbulence.

According to a further feature of the invention the inserts can be designed as grids arranged in transverse relation to the duct axis, the intervening cross-section between the grid bars being of such dimensions as to ensure that resistance to flow in the intake duct is held within tolerable limits.

In conjunction with internal combustion engines comprising spiral-shaped intake ducts featuring a duct tongue forming a breaking edge in front of the spiral-shaped duct portion, another embodiment of the invention provides for one part current being directed via a recess of the duct tongue in the direction of the axis of the intake valve where it is united with the main air current. In that case, increased turbulence of the current is produced in the duct spiral shortly before its admission to the cylinder, the rotational current produced by the spiral duct and the additional turbulence caused by the clash between the two part currents above the intake valve being superposed upon each other, boosting their respective effects.

Finally, according to a further embodiment of the invention used in connection with internal combustion engines comprising spiral-shaped intake ducts featuring a duct tongue in front of the spiral-shaped duct portion, the duct tongue extends from the valve guide member as far as the outside diameter along an approximately straight line in tangential relation to the valve guide members, forming an angle, preferably of less than 60°, with the line connecting the cylinder center with the valve center. This design of the duct is responsible for the two part currents entering the cylinder and rotating about the cylinder axis in opposition to each other.

Figure 2:
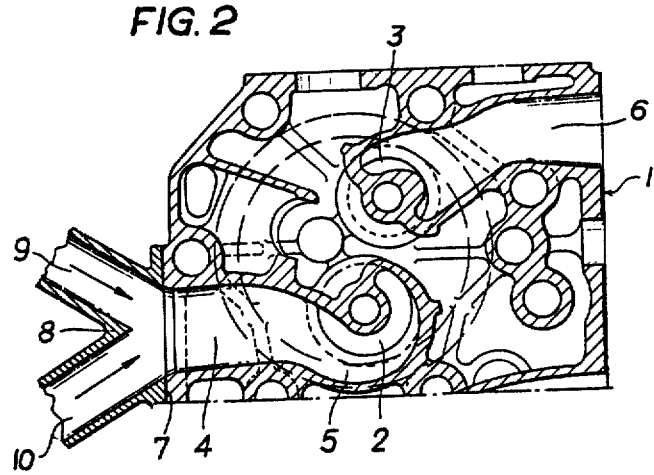
Figure 18:
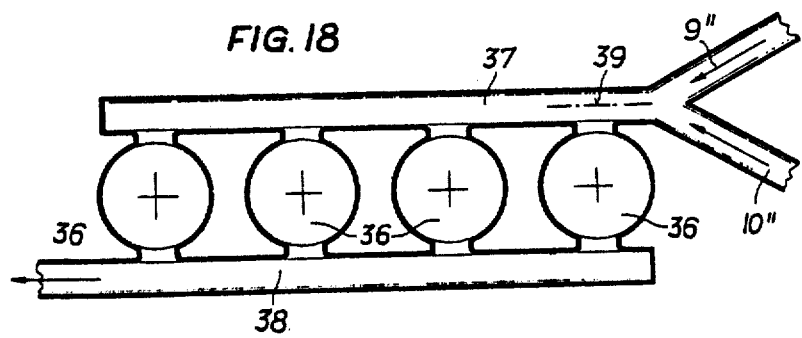
Figure 9:
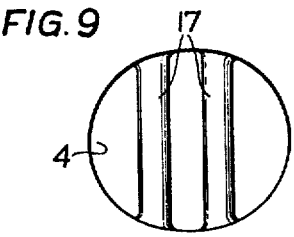
Figure 10:
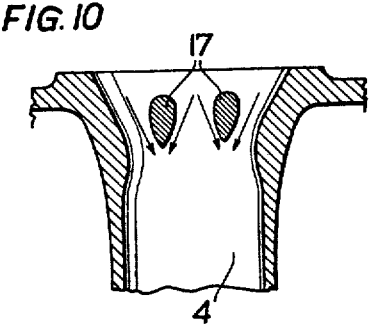
Figure 11:
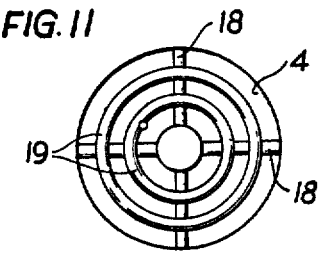
Figure 12:
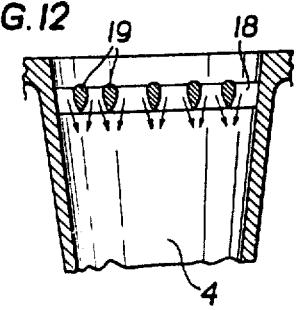

Further details of the invention will become apparent from the following description of several embodiments of the invention with reference to the partially schematic drawings wherein FIG. 1 is a vertical cross-sectional view of a cylinder head according to the invention, FIG. 2 is a horizontal cross-sectional view of the cylinder head shown in FIG. 1, FIGS. 3 thru 8 each show an example of an intake duct arrangement according to the invention, FIG. 9 is a front view and FIG. 10 a horizontal cross-sectional view of an intake duct according to the invention, FIG. 11 is a front view and FIG. 12 a horizontal cross-sectional view of another variant of the intake duct according to the invention, FIGS. 13 thru 17 are front views of other types of intake ducts according to the invention, FIG. 18 is a schematic plan view of a multicylinder internal combustion engine according to the invention, FIG. 19 a schematic view of a spiral duct according to the invention, shown in the direction of arrow XIX in FIG. 21, FIG. 20 a cross-sectional view on line XX—XX, and FIG. 21 another cross-sectional view on line XXI—XXI of FIG. 19.

The cylinder head 1 of a water cooled internal combustion engine as shown in FIGS. 1 and 2 comprises an intake valve 2 and an exhaust valve 3, the valve ports of which extend alongside opposite sidewalls of the cylinder head 1. The inlet port 4 is a spiral duct comprising a spiral-shaped portion 5 wound around the shaft of the intake port 2 and sloping off in the direction of the valve. The exhaust port is designated by reference number 6.

Flanged onto the suction-end cylinder head sidewall 7 is a V-shaped tubulure 8 comprising two ducts 9 and 10 converging at an acute angle. Through these ducts 9 and 10 the intake port 4 is impinged upon by the air for combustion. The direction of flow in the ducts 9 and 10 is indicated by arrows. At the point of transition from ducts 9 and 10 to the intake port 4, the two part air currents clash with each other at an angle so as to produce vigorous turbulence in this part of the intake system. The turbulent air for combustion is then imparted additional rotation in the spiral-shaped portion 5 of the intake port 4. By superposition of turbulence and rotation a most uniform distribution of the combustion air admitted through the intake valve 2 in the cylinder of the internal combustion engine and an intimate mixture of fuel and air is achieved in the cylinder. As a most noteworthy result of these flow conditions a constant combustion temperature is produced and maintained in the cylinder with a consequent drop of the percentage of $NO_x$ in the exhaust gas.

The required turbulence of the combustion air can also be obtained by means of inserts in the intake system dividing the air current into two part currents $Q_1$ and $Q_2$ converging at an angle and reuniting behind the said inserts so as to produce a common turbulent air current. Similar arrangements are illustrated in FIGS. 3 thru 8. As shown in FIG. 3, an integral hollow insert 13 is cast in the branch 11 of the suction pipe 12 leading to the inlet port 4 so as to divide the inlet cross-section into two individual ducts 9' and 10' for the two part currents converging at an acute angle. In this case, turbulence occurs already in the foremost portion of the inlet port 4.

The design illustrated in FIG. 4 differs from the one shown in FIG. 3 essentially insofar as the suction pipe 12 is located closer to the suction-end cylinder-head sidewall 7 and that the insert 14 is a solid rib protruding as far as the cylinder head sidewall 7.

FIG. 5 shows an embodiment of the invention in connection with an inlet port 4 comprising a marked spiral 5. Again, turbulence and rotation of the air for combustion are superposed as shown in FIGS. 1 and 2.

The embodiment shown in FIG. 6 differs from the one illustrated in the preceding figure essentially insofar as the duct tongue 15 of the inlet duct 4 forming a breaking edge presents an approximately rectangular recess 16 through which a partial air current passes which is substantially directed towards the shaft of the intake valve 2. This partial air current clashes with the main air current directed via the duct tongue 15 into the spiral-shaped duct section 5 prior to entering the cylinder, thereby producing additional turbulence superposed upon the rotation caused in the spiral-shaped duct portion 5.

As appears from FIGS. 7 and 8, the inserts intended for the splitting of the combustion air into two part currents may, if necessary, be located inside the inlet port 4. In both cases the inserts consist of a cast-in integral rib 14 of an approximately tear-shaped cross-section whose peak is facing the intake valve 2. According to both designs, the suction pipe 12 can be located close to the cylinder-head sidewall 7.

In the embodiment shown in FIGS. 9 and 10 the inlet port 4 comprises two inserts in the form of parallel transverse ribs 17 which serve to produce the required turbulent flow. As a result, two areas are obtained wherein turbulence is caused by the clash between the two part currents indicated by arrows, so that the turbulent air is evenly distributed over the entire cross-section of the duct.

As shown in FIGS. 11 and 12, the inserts for the production of a turbulent current in the inlet duct 4 can also be designed as a grid comprising, for example, four radial ribs 18 and concentric ribs 19. The area in which a turbulent current is produced is therefore, distributed over almost the entire cross-section of the inlet port 4.

Figure 13:
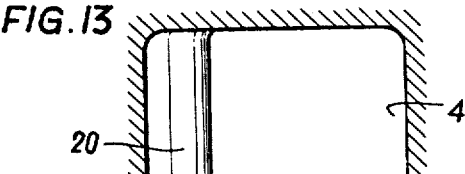
Figure 14:
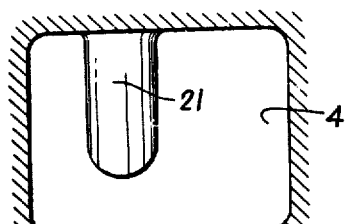

FIGS. 13 thru 17 illustrate various types of turbulence-producing inserts in the inlet duct according to the invention. The most advantageous shape and arrangement of the inserts for any given type of engine can be determined by trial and error. As shown in FIG. 13, a single lateral rib 20 is provided to deflect part of the air current sideways so as to clash with the straight-flowing main air current at an angle. Experience goes to show that turbulence can also be produced in the inlet port by means of a rib 21 which, as shown in FIG. 14, does not extend through the entire cross-section of the duct.

Figure 15:
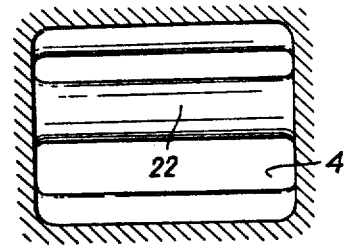
Figure 16:
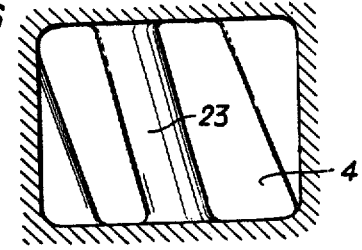
Figure 17:
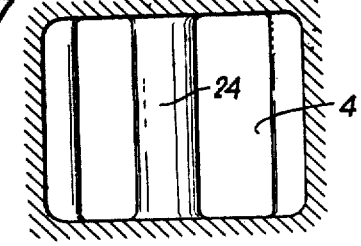

The most convenient arrangement and location of the ribs in the inlet duct 4 depent both on flow conditions in the suction pipe and on the pattern of the portion of the inlet duct 4 behind the rib. For example, it may prove advantageous to provide, as shown in FIG. 15, a rib 22 which is offset in relation to the center of the duct and vertical in relation to the associated cylinder, or as appears from FIG. 16, an inclined rib 23 can be provided behind which the inlet port 4 is narrowed. A similar design featuring a rib 24 parallel to the axis of the associated cylinder is shown in FIG. 17. Yet another way of producing the required turbulence of the air for combustion in the intake system of a multicylinder internal combustion engine becomes apparent from FIG. 18. The cylinders 36 of the engine are fed from a common suction manifold 37 in a manner known per se. The air for combustion is delivered to the suction manifold 37 through two part ducts 9'' and 10'' forming an angle between themselves, in such a manner that turbulence is already produced in the area of the suction manifold 37, designated by reference number 39. Experience has shown that turbulence of the current is maintained as far as the cylinder 36 which is farthest from the area 39, so that as a rule, additional turbulence-producing measures in the areas of the junctions of the inlet ports with the manifold 37 will not be necessary. The arrangement as shown in FIG. 18 is of a particularly simple design.

In addition to the various arrangements as hereabove described and as illustrated in and by the accompanying drawings, it is also possible, according to the invention, to produce a turbulent current in the intake system by means of a duct of particular design wherein the additional turbulence is essentially caused in the cylinder proper only. This is achieved according to FIGS. 19 thru 21 by the particular design and location of the inlet port 25 in relation to the cylinder wall 26, the underlying idea being due to the realization that turbulence in the cylinder is considerably increased if the air current emerging from the inlet port 27 and entering the cylinder, rotates only in part in the sense of the duct spiral 28, whereas the remaining air current emerges in such a manner that it is so deflected by the cylinder wall 26 as to produce a counter-rotation, thus clashing with the main air current.

FIG. 19 is a schematic illustration of parts of the corresponding streamlines. The velocity vectors 40,41 emerging from the clearance are directed, partly clockwise, partly anticlockwise, off the radial direction. The velocity vectors 40 deflected clockwise off the radial direction are causing a clockwise rotation. As they approach the cylinder wall 26, they are bent by mutual influence so as to produce circular or helical streamlines.

The inlet duct 25 as shown comprises exhaust vectors 41 directed anticlockwise off the radial direction of the valve opening. The counter-rotation thus produced is further enforced by the adjacent portion of the cylinder wall 26. The mainstream 40' rotating clockwise impinges inside the cylinder in the area indicated by broken lines 42 upon the smaller mass flow 41' moving in contrary direction, thereby producing extremely intense turbulence in this area. Since the mass of the counter-current 41' is smaller than that of the main current 40', the resulting final charge of the cylinder will rotate clockwise, with the smaller turbulences of the area 42 following along with it.

Much depends on the location of the spiral tongue 29 whether an adequate counter-flow or only rotation in the same sense of the entire charge entering the cylinder is produced inside the same. In order to produce flow conditions with a definite countercurrent, the spiral tongue 29 of the inlet duct 25 extends from the valve guide member 30 as far as the outer diameter of the duct approximately along a straight line and in tangential relation to the valve guide member 30, forming an acute angle α with the connecting line 31 between the cylinder center 32 and the valve center 33, the said angle being smaller than 60 degrees. If the extremity 29 of the duct spiral shown in FIG. 19 is deflected clockwise by a mere 5°, the counter-flow 41' is reduced to such an extent that the desired result, that is, constant smoke behavior independent from ignition timing, is lost.

As regards the cross-sectional shape of the spiral-shaped portion 28 of the inlet duct 25, experience goes to show that observance of the following angle pattern of the duct walls in relation to the valve axis as illustrated in FIGS. 20 and 21 is particularly convenient: The angle β between the upper duct wall 34 and the valve axis should be somewhere between 30° and 60°, whereas the angle γ between the sidewall 35 of the duct and the valve axis 33 should be anywhere from 20° to 50°. Provided these angles are properly selected, the mainstream and the part current flowing in opposite direction, both moving spiralwise downward in the cylinder, enter the cylinder at about the same pitch, so that a vehement clash is produced. If their respective pitches differ widely, there is the risk of both currents flowing crosswise alongside each other, thereby reducing the formation of minor turbulences.

The most advantageous angle relationships and cross-section conditions are best determined by trial and error.

Turbulence of a current is conducive to a flow loss lowering the delivery rate, that is, the relative amount of air entering the cylinder. In order to compensate for this loss, the internal combustion engine can be supercharged by means of a rotary-blower-type supercharger in a manner known per se, so as to obtain approximately the same delivery rate as in an internal combustion engine without a supercharger and without a device for producing additional turbulence.

We claim:

1. An internal combustion engine with interior mixture formation, particularly a diesel engine, comprising at least one intake valve arranged eccentrically in relation to the cylinder axis for each cylinder, an inlet port extending from one side of the cylinder head to said intake valve, said inlet port having an elongated supply portion extending from said side of the cylinder head toward the intake valve and a portion adjacent the said supply portion and wound spirally around the intake valve and sloping towards the same, a port tongue formed in said inlet port and extending from said supply portion into said spiral-shaped port portion, said port tongue defining a sharp edge for the current of combustion air in said inlet port, a valve guide bearing extending through said spiral-shaped port portion, said port tongue extending from the valve guide bearing to the outside diameter of the inlet port approximately along a straight line and in tangential relationship to the valve guide bearing and at an acute angle of less than 60° relative to a plane containing the axes of the intake valve and of the associated cylinder.

2. An internal combustion engine according to claim 1, wherein the spiral-shaped port portion comprises an upper boundary wall and a sidewall, said upper boundary wall forming an angle β of about 30° to 60° with the axis of said intake valve and the sidewall forming an angle γ of about 20° to 50° with the axis of the intake valve.

* * * * *